April 28, 1953 J. G. FORD 2,636,257
PROTECTIVE FINISH FOR METALS
Filed Sept. 23, 1950
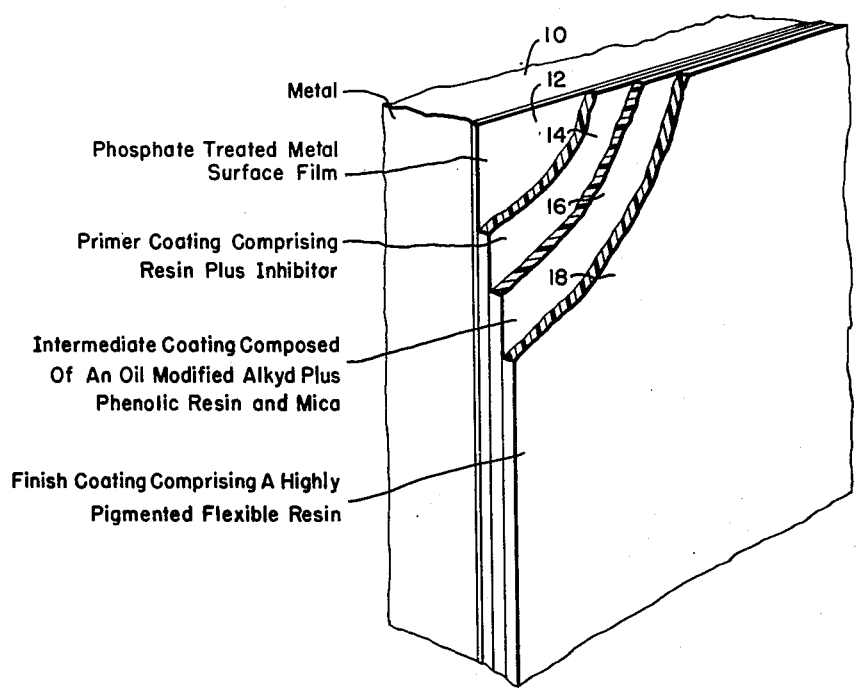
INVENTOR
James G. Ford.

Patented Apr. 28, 1953

2,636,257

UNITED STATES PATENT OFFICE 2,636,257

PROTECTIVE FINISH FOR METALS

James G. Ford, Sharon, Pa., assignor to Westinghouse Electric Corporation, East Pittsburgh, Pa., a corporation of Pennsylvania Application September 23, 1950, Serial No. 186,431

5 Claims. (Cl. 29—195)

This invention relates to protective finishes and, in particular, to members provided with a plurality of layers of organic finishes cooperating to provide unusual corrosion resistance.

For protecting the exposed surfaces of metallic member whereby to prevent corrosion, organic finishes have been applied to such exposed surfaces. Outdoor exposure to the elements is particularly severe on metals. However, the organic finishes employed heretofore have had a relatively short life because of their inability to withstand one or more of the deteriorating factors involved in outdoor exposure. Among the deteriorating factors that operate on organic finishes to cause their premature failure are sunlight, and in particular the ultraviolet portion thereof, moisture, the oxygen content of the air, corrosive gases such as sulfides and sulfur dioxide that are present in industrial atmospheres, salt that may be present in the atmosphere along seacoast areas, and grit and dust. Heat is a deteriorating influence in many instances. For example when intense sunlight is directed against an organic finish the temperature of the finish ray rise to relatively high values and chemical deterioration of the organic finish takes place or else differences in the relative thermal expansion between the organic finish and the metallic surface to which it is applied causes a loosening of the organic finish.

Each of these factors does not necessarily operate independently but frequently a combination of factors may function to cause an early failure of an applied organic finish.

If an organic finish wears away as by abrasion, chalking or the like, from the exterior surface, a time is eventually reached at which it affords no substantial protection to the underlying metal and the member must be refinished to prevent its corrosion. However, it is rarely that an organic finish wears uniformly.

An organic finish may fail by cracking, chipping or spalling whereby underlying metal is exposed at many points, though forming a relatively small proportion of its total area, to the atmosphere and corrosion will take place at such exposed points. Ordinarily, an organic finish is considered to have failed when cracked or exposed at a substantial number of places even though the organic coating otherwise is satisfactory.

If an applied organic finish becomes slightly detached or loosened from the metal surface to which it is applied, moisture will penetrate into the space between the metal surface and the applied organic finish and ordinarily will initiate corrosion of the metal member from which point corrosion ordinarily will spread and cause flaking or peeling of the organic finish. Corrosion induced at a substantial number of cracks or pinholes or other flaws extending through a coating of organic finish to the underlying metal tends to spread rapidly beneath the organic finish and for all practical purposes the organic finish has failed.

Ordinarily, organic finishes are applied to the exposed surfaces of metallic members primarily to provide resistance to corrosion and other deterioration of the metal. However, an organic finish functions to improve the appearance of metallic members. For this reason, organic finishes are colored either by the use of pigments or dyes. Furthermore, an organic finish may have a smooth or pleasing texture or appearance whereas the metal to which it is applied may be relatively rough or of unattractive surface appearance.

If the applied organic finish fails to impart corrosion resistance or if it fails to give a desired artistic appearance either in color or surface texture, it is usually necessary to remove the applied organic finish and to refinish the member. The cost of removing finishes, particularly from members in service, is extremely costly because of the large amount of manual labor that is ordinarily required. Similarly, the application of a new finish is more costly in service or in the field than when members are finished as a part of their manufacturing process. For example, referring to the electrical industry, a transformer may be finished in the manufacturing shop at a relatively low cost. When the transformer has been put into service and its protective finish has deteriorated to the extent that the transformer needs to be refinished, it usually requires that the transformer be removed from a substation or a pole or wherever it is located, and returned to a maintenance shop for removal of the old finish and application of the new finish and then returned to service. This handling and removal from service is an extremely costly item. Furthermore, the average maintenance shop cannot employ production line equipment such as employed by the transformer manufacturer, and consequently a much greater amount of manual labor is required to remove the old finish and to apply new finish.

The amount of manual labor required to remove the old finish may be greatly increased if the metal has been badly corroded by reason of the failure of the original shop finish since the removal of metal corrosion products and the original finish may be extremely time consuming.

It is well known that corrosion products must be thoroughly removed to the clean, bare metal if a subsequently applied finish is to function at its maximum effectiveness. It has been estimated that the cost of removing corrosion products from members in the field as compared to removing corrosion products from steel in the manufacturing plant is approximately five to ten times greater in the case of the former. All other costs go up proportionately. Thus where phosphating of steel may be carried out by the initial apparatus manufacturer in a conveyorized system, it will be less expensive than when performed in the field or in a maintenance shop, the latter being more expensive by a factor of from five to twenty times.

From these various factors, it will be apparent that it is extremely important to provide the longest lasting finish to a member that is to be exposed to outdoor atmospheres for most of its life in order to avoid refinishing for the expected service life of the member, if possible, or to enable the protective finish to last the utmost possible length of time before requiring refinishing.

Mere increase of thickness of an applied protective organic finish does not necessarily produce a corresponding increase in the effective life of the organic finish. Sometimes, on the contrary, extremely heavy coatings of organic finishes may crack or chalk or otherwise fail mechanically or physically before a much thinner coating of the same organic finish will so fail. Again, an organic finish may have outstanding resistance to nearly all of the factors involved in outdoor weathering or exposure but so lacking in resistance to a single one of the factors that, due to lack of adequate resistance to only this one factor, it will fail rather promptly as compared to another organic finish which may not have as good resistance to all of these former factors but having better resistance to the single factor.

Furthermore, it will be appreciated that with the exception of certain specialized cases, it is desirable to employ a single type of organic finish that may be applied to members which may be employed under a variety of weather conditions. For example, it is impractical to have available a series of different organic finishes to be applied to a given member, the particular finish selected and applied being determined by the particular field or service use of the member. It is particularly desirable that members, for example transformers, be provided with one type of organic finish suitable for satisfactorily meeting all possible service conditions, that is, industrial atmospheres, seacoast atmospheres, tropical conditions, and the like.

The object of this invention is to provide metallic members with an organic finish composed of a plurality of coatings cooperating to provide a high degree of protection against the corrosive effects of an outdoor atmosphere whereby the organic finish functions effectively for prolonged periods of time.

A further object of the invention is to provide on the exposed surfaces of a metallic member a plurality of cooperating coatings of organic finish having an unexpected durability and resistance to the elements.

A still further object of the invention is to provide a process for applying to metal surfaces a plurality of superimposed protective coatings including organic finishes to enable an unusual degree of protection for long periods of time against corroding atmospheric conditions.

Other objects of the invention will in part be obvious and will in part appear hereinafter. For a better understanding of the nature and objects of the invention, reference should be had to the following detailed description and drawing, in which the single figure is a fragmentary enlarged view in perspective, partly broken, of a metal member with a preferred embodiment of the protective finish of the invention applied thereto.

It has been discovered that the surfaces of metallic members may be provided with a plurality of protective coatings including organic finishes cooperating to protect the metal from corrosion to an unusual degree under substantially all varieties of atmospheric conditions for unusually long periods of time. Briefly, the cooperating protective coatings applied to metal surfaces comprise (a) a primer coating comprising a cured relatively flexible synthetic resin embodying a high proportion of certain corrosion inhibitors, (b) superimposed thereupon an intermediate coating comprising a cured flexible synthetic resin having intimately and uniformly admixed therein from 15% to 40% based on the weight of the resin of finely divided mica and no substantial amount of other solid filler, and (c) an exterior finish coating comprising a flexible cured layer of synthetic resin embodying a high proportion of finely divided fillers cooperating to prevent the passage of ultraviolet radiation through the finish coating. Each of these coatings is of a thickness of the order of 1 mil. Ordinarily, the thickness of each coating should not be less than approximately 0.3 mil and the thickness in exceptional instances may be up to approximately 3 mils, but not so thick, depending on the type of synthetic resin and the amount of filler therein, as to render the coating inflexible or brittle and subject to cracking or other failure under expected service conditions. It has been found that coatings of the order of 0.8 to 1.5 mils thickness are of substantially the optimum thickness. In addition to these three coatings comprising organic finishes, for the utmost protection the metal itself should be provided with a protective film or coating such for example as a phosphate film, or other durable integral metal conversion coating.

Metallic members to be treated in accordance with the present invention should be provided with a clean surface substantially free from scale, oxides, dirt, grease or any other matter that will prevent the highest adhesion of subsequently applied organic finishes. To this end, the metallic surfaces may be sand blasted, brushed, pickled or electrolytically etched to remove any loose or mechanically held substances on the surface of the metal. Burrs and sharp edges are preferably sanded or abraded to round off any sharp points so that a better paint coating be applied thereon. The members may be degreased or treated in a solvent type cleaner before or after this mechanical treatment. It is desirable that clean, sound metallic surfaces be available for subsequent treatment. The cleansing of metal is well known and it is not a feature of this invention to prescribe suitable treatments to produce the desired clean metal surface.

The clean metal surface is then provided with an integral metal conversion coating, preferably of the phosphate type for metals selected from the group consisting of ferrous metals, zinc, cadmium and aluminum. It should be understood that ferrous metal may be zinc plated or galvanized if desired to secure the utmost corrosion resistive surfaces. The exterior zinc coating may be phosphate treated in accordance with known practices.

Protective phosphate coatings may be produced on ferrous metal by applying thereto a solution having the following composition:

| | | |
|---|---|---|
| Manganese phosphate | pounds | 1¾ |
| Phosphoric acid (85%) | do | 5 |
| Sodium nitrate | do | ½ |
| Cupric nitrate | ounce | ¼ |
| Water to make one gallon. | | |

This solution is diluted with water in the proportion of 33 parts of water to one part of the solution, and the resulting diluted solution applied to the metal surfaces. Clean ferrous metal need be treated only a few minutes in this solution to produce on the surface an adherent protective phosphate coating.

For treating zinc surfaces, a suitable aqueous solution has the following composition, in which all parts are by weight:

| | Percent |
|---|---|
| Zinc phosphate | 0.04 |
| Iron | 0.03 to 0.3 |
| Sodium nitrate | 0.2 to 1 |
| Phosphoric acid (85%) | 1 |
| Water | Remainder |

The zinc surfaces may be activated before phosphating by using the titanium activating pre-dip disclosed in Jernstedt Patent 2,310,239. It will be understood that there are numerous other phosphating solutions known in the art for treating various metals and such may be used here, note for example, the various solutions given in Patent 2,348,698. The phosphate coatings are preferably sealed with a hot (90° C.–100° C.) aqueous sealing solution, for instance, as one containing 7.5 ounces of chromic acid per 100 pounds of water, to impart maximum corrosion resistance to the phosphate coating. The metal with the surface conversion coating thereon is dried and then provided with a plurality of layers of organic finishes of the present invention.

Referring to the single figure of the drawing, there is illustrated a metal body 10 provided with an integral phosphate treated surface film 12. The film 12 is highly adherent to the metal and provides a good surface for the reception of the organic finish. Upon the surface film 12, there is applied a priming coating comprising essentially a synthetic resin embodying a substantial amount of a corrosion inhibitor. The priming coating may be applied by brushing, spraying, dipping or the like. The priming coating composition may comprise as its essential components a synthetic resin having a high degree of adhesion to the metal. Suitable resins for this purposes are fatty oil- or fatty acid-modified alkyd resins, oil modified phenolic resins, melamine resins and the like, or mixtures of any two or more. A linseed oil fatty acid-glycerolphthalate resin is well adapted for use as a priming coating resin. The resin is dissolved in a suitable volatile solvent which may comprise any one or more readily evaporable organic solvents such for example, as ketones (methyl ethyl ketone), alcohols (ethanol or butanol), or a volatile hydrocarbon (toluene, xylene and low boiling petroleum fractions).

Intimately dispersed throughout the solution of the priming coating resin solution is a corrosion inhibitor selected from at least one of the class consisting of inhibiting chromate and phosphate compounds. Examples of suitable inhibiting chromates and phosphates are zinc chromate, zinc phosphate, lead chromate, manganese phosphate, calcium chromate and the like. The corrosion inhibitor should comprise at least 25% of the weight of the resin and may amount to 150%. It is preferred that the primer coating contain a substantial proportion of iron oxide. The combination of iron oxide and a chromate or phosphate appears to give better results than when the iron oxide is not present. The iron oxide may be present in proportions equal to from 10% to 75% of the weight of the corrosion inhibitor proper. The iron oxide and the corrosion inhibitor may be incorporated into the priming coating by milling, particularly in a ball mill or a roller mill. If desired, a small amount of coloring pigment or dye also may be present in the primary coating.

The following example is a typical priming coating composition illustrative of those suitable for the practice of the invention.

*Example I*

A priming composition comprised 48½% by weight pigments and 51½% by weight vehicle. The pigments comprised 75 parts of zinc chromate, 25 parts of iron oxide and 2.8 parts of carbon. The vehicle comprised 66% resin and 34% solvents. The resin was a linseed oil fatty acid modified-glycerol-phthalate resin.

When applied to the surface film 12, the priming coating is present in a layer of sufficient thickness so that upon drying it forms a cured layer 14 of a thickness of 0.8 to 1.5 mils though, as pointed out previously, the thickness may be slightly less or greater than this range of values. The priming coating may be air dried though it has been found that baking the priming coating for 30 minutes at 200° F. will produce a harder film. A homogeneous highly adherent hard film suitable for the application of the intermediate coating thereon is produced in either event.

The priming coating has superimposed thereon an intermediate coating 16 comprising a flexible synthetic resin having intimately and substantially uniformly dispersed therein only finely divided mica in the proportion of 15% to 40% by weight of the resin. Particularly good results have been secured with intermediate coating having from 25% to 35% by weight of mica based on the weight of the resin. The mica should be of a fineness such that it will pass completely through a sieve having 100 meshes per lineal inch. For best results, the mica should be fine enough such that most of it will pass through a sieve having 325 meshes per lineal inch. Mica of this fineness has an average size across each flake of approximately 40 microns or less. Finely ground mica known as micronized mica will give particularly good results. This micronized mica has an average particle diameter of from 5 to 20 microns or even less. The mica may be either the white (muscovite) or grey (biotite) mica. The mica flakes are substantially thinner than the diameter dimensions given, usually the thickness of the flakes being less than 0.5 micron. The commercial powdered mica products are not of uniform size, that is, commercial 325 mesh mica comprises a finely divided mica of which over 95% passes through a 325 mesh sieve, the small portion remaining on the sieve will all pass through a 200 mesh sieve, and of the portion passing through the 325 mesh sieve, there is a very substantial part that is of a fineness of less than 10 microns in diameter. Such variability in size and shape of the mica flakes is not detrimental.

The mica may be incorporated into the intermediate coating composition in any one of several ways. The mica flakes may be placed within an enclosed chamber which is then evacuated to a low pressure of less than 1 millimeter of mercury, preferably to as low as an absolute pressure of 1 micron of mercury. There is then introduced into the evacuated chamber the synthetic resin solution or if desired the solvent for the synthetic resin solution, and the mica and either of these liquids thoroughly admixed by use of a suitable stirrer. By reason of low air pressures, the liquid will penetrate readily between the mica flakes and thereby form an extremely uniform dispersion. It is feasible to introduce the finely divided mica and the solution of organic resin or the organic solvent into a ball mill and to subject the mixture to ball milling for several hours to produce a uniform dispersion of the mica flakes in the composition. In both instances, when the solvent alone is used for preparing the dispersion of mica flakes, the synthetic resin dissolved in the solvent is added and further mixing or milling imparted to secure a uniform blending of the resin and the mica dispersion. The resulting dispersion of finely divided mica in the synthetic resin solution is applied upon the priming coating 14 in sufficient thickness so that upon evaporation of the solvent and the curing of the synthetic resin, there results an intermediate layer 16 of the thickness of from 0.8 to 1.5 mils.

It is desirable that the intermediate coating comprise a flexible synthetic resin. I have obtained particularly good results with a synthetic resin comprising a mixture of either a straight phenolic resin or an oil modified phenolic resin and a fatty acid modified alkyd resin. The phenolic resins are preferably prepared from substituted phenols, such for example as cresols, cresylic acid or paratertiary butyl phenol. The phenolic resins are reacted with from about 1 to 1.5 moles of formaldehyde per mole of phenol to produce a thermosettable phenolic resin. If an oil modified phenolic resin is to be prepared, from 10 to 50% of an oil, based on the weight of the phenol, may be reacted into the phenolic resin. A suitable procedure and other examples of proportions are set forth in Auxier et al. Patent 2,383,283. The following example is illustrative of one composition suitable for practice of the invention.

*Example II*

Cresylic acid and formaldehyde are reacted in equimolar proportions in the presence of an alkaline catalyst. From about 1 to 1.5 moles of formaldehyde per mole of cresylic acid are suitable proportions. Formaldehyde or polymers of formaldehyde or substances engendering formaldehyde may be used in producing the phenolic resin. Suitable catalysts are organic amines, and alkali metal and alkali earth metal hydroxides and carbonates. Sodium hydroxide, barium hydroxide and ethylene diamine are examples. When the "A" stage of reaction has been substantially reached, the resin is precipitated in water in order to remove excess phenol. A substantially phenol-free reaction product is desirable, but not critical, for the purpose of the invention. After purification in water, the phenol-formaldehyde condensate is removed and dissolved in solvents therefor. A mixture of ethyl alcohol and ethyl acetate is an example of a suitable solvent.

In another reaction vessel, two parts of phthalic anhydride, one part of glycerol, and one part of linseed oil, all proportions being by weight, are reacted for about one-half hour at temperatures of from 180° to 200° C. The condensation product should be continually stirred and the temperature increased at the end of the half-hour initial period to about 220° C. for a further period of from one-half hour to three-quarters of an hour. This product is an oil modified alkyd resin.

Fifty parts by weight of the oil modified alkyd resin are admixed with 15 parts of the phenolic resin. Twenty parts of mica in a container evacuated to 1 millimeter of mercury are then admixed with the resin mixture dissolved in a solvent.

The main requirement to be met by the alkyd resin product is that it be highly flexible when dried in films. To provide for this flexibility, effective quantities of fatty oils, drying oils or oil acids should be reacted with a dibasic acid and a polyhydric alcohol. Examples of suitable oils are linseed oil, soybean oil, fish oils, castor oil, and tung oil, and oil acids such as ricinoleic acid. The dibasic acids may be succinic, maleic, adipic, phthalic or sebacic acids or their anhydrides, or mixtures thereof. The polyhydric alcohols reacted therewith may be selected from ethylene glycol, glycerol, trimethylene glycol, pentaerythritol and the like. The proportions of the three reactants may be varied to meet requirements, but in general, it is preferred to react the components in approximately equimolar quantities or with a nearly equal proportion of carboxyl to hydroxyl groups provided by the dibasic acid and the polyhydric alcohol, respectively, or not over a 30% excess of either. The oil or fatty acid may vary from 10% to 75% of the weight of the acid and polyhydric alcohol.

The phenol-formaldehyde resin in the "A" stage is combined with the oil-modified alkyd resin in the proportion of from 10 to 25 parts of the phenol formaldehyde resin and from 25 to 100 parts of oil-modified alkyd resin. With the larger proportions of phenol formaldehyde, the composite resin will produce a much harder body or coating after curing by a heat treatment.

The finely divided mica flakes admixed in the applied coating assume an overlapping or leafing arrangement. Inasmuch as there is a relatively large proportion of the mica flakes in the cured coating, the mica imparts resilience and an improved resistance to cracking or other mechanical failures. Furthermore, the mica flakes impart an unexpected resistance to oxidation and the passage of moisture through the cured coating. The mica flake-resin coating has extraordinary resistance to heat and oxygen deterioration. Tests indicate that the thermal life or resistance of the resin is increased in the order of ten times by the addition of 25% of its weight of mica flakes, when tested in air at elevated temperatures.

The intermediate coating 16 should contain no substantial amount of other solid fillers or pigments or the like other than the mica flakes. Organic dyes such as malichite green or not over 1% by weight of a pigment such as zinc chromate or lampblack may be added to color the coating. It has been found that more than this small percentage of other solid filler markedly reduces the protective value of the mica flake layer. Apparently an excess of solids interferes with the desired close leafing or overlapping of the mica flakes.

It has been found that the intermediate coating 16 should not be the exterior finish if best results are desired due to the fact that resistance of the mica-resin intermediate coating to ultraviolet light is relatively poor and it will deteriorate relatively rapidly on exposure to strong sunlight whereby the resin chalks and the mica flakes drop off, so that the intermediate coating by itself will last only a relatively short time as compared to other protective coatings.

In order to provide outstanding life to the coatings 14 and 16, there is provided an exterior finish coating 18 over the intermediate layer 16. This final finish coat comprises a synthetic resin embodying a high proportion of pigments selected to block completely the passage of ultraviolet light therethrough. To this end, there are selected solid fillers or pigments adapted to prevent the passage of ultraviolet light. Suitable finely divided pigments for this purpose are basic lead carbonate, titanium dioxide, zinc oxide, zinc sulphide carbon, iron oxide, lithopone, powdered aluminum or aluminum flakes, zinc chromate, and lead chromate. Preferably, a plurality of these pigments are combined in sufficient proportions and amount so that a finished coating of a thickness of approximately one mil is opaque to ultraviolet, for example, of a wave length of 3655 Angstroms. The filler particles should be of a size less than 40 microns.

A suitable composition for this purpose was one comprising 45% by weight of vehicle and 55% by weight of pigments. For a grey paint, the pigment comprised 75 parts of leaded zinc carbonate, 19 parts of zinc sulphide and 6 parts of carbon black. The vehicle comprised 68 parts of linseed oil modified glycerol phthalate resin and 32 parts of volatile organic solvents. Another example is a composition comprising 48% by weight of pigment of which 90 parts are antimony oxide, 5 parts are carbon, 2 parts are iron oxide and 3 parts are lead chromate. The vehicle comprised 52% of which 52 parts were an alkyd resin and 48 parts comprised a volatile solvent. The pigments or fillers in the composition should comprise at least 50% of the weight of the resin in the composition. The resin forming exterior coating should be particularly flexible. The resin for the exterior coating may comprise an oil modified alkyd resin or a fatty acid modified alkyd resin, melamine resin or epoxy resin comprising the reaction product of a bisphenol with an epichlorhydrin.

Additional coatings corresponding, respectively, to the intermediate coating and the exterior finish coating may be applied over the coating 18 to provide a five-coating protective finish on the member 10 if desired. Furthermore, the intermediate coating 16 may comprise two successive applications, each for example of the thickness of 0.5 to 0.8 mil, with the first coating baked or cured before the second coating is applied thereon. To develop the optimum properties of the coating composition, the coating 18 should be baked in an oven or by infrared heating. However, to enable retouching of the finish coat, in case it is scratched or damaged, an air-drying finish is better.

Comparative tests have been carried out wherein two series of members, such as transformer tanks, were painted (1) in accordance with the best teachings of the prior art practice involving a priming coating and two finish coatings baked thereon and (2) in accordance with the teachings of the present invention, wherein the applied organic finishes were of the same total thickness in each case, that is approximately three mils. When subjected to accelerated weathering test in a salt spray chamber, the transformer tanks prepared in accordance with the present invention showed no failure or corrosion of the underlying metal while the transformer casings painted in accordance with accepted standards for the best protective finishes had failed in many spots and the underlying metal had corroded badly, at the end of the test.

In another test, a series of transformers whose tanks had been prepared in accordance with the present invention were mounted on a seacoast location where they were exposed to strong sunlight and salt and vapor laden sea winds, along with a series of transformers provided with a similar thickness of organic finish applied in accordance with the best previous practice. At the end of over a year's service, the protective finish provided in accordance with the present invention showed no noticeable deterioration or change in appearance whereas the finishes on the tanks applied in accordance with prior art practice had deteriorated in appearance and exhibited rusting and other corrosion at many points. Conservative estimates of the increase in life afforded by the protective finish combination of the present invention are that the protective finish of the present invention will last from 5 to 10 times as long as to reach the same condition of deterioration as the finishes provided by the best prior art practices.

In particular, the effects of moisture and atmospheres carrying corrosive agents such as sulfurous gases and salt appears to be greatly reduced due to the presence of the mica bearing intermediate coating. Water and other corrosive agents do not appear to penetrate through the mica bearing intermediate coating.

The appearance of the protective finish applied in accordance with the present invention is excellent and compares very favorably with the best produced heretofore. The smoothness and covering power of the protective coatings is excellent and has been accepted in manufacturing practices as comparable with, if not superior to, that secured in accordance with previous practices.

Since certain changes in carrying out the above process, and certain modifications in the article which embody the invention may be made without departing from its scope, it is intended that all matter contained in the above description or shown in the drawing shall be interpreted as illustrative and not in a limiting sense.

I claim as my invention:

1. A metallic member having exposed surfaces, comprising, in combination, a plurality of cooperating protective coatings applied to the exposed surfaces, the protective coatings consisting of a first primer coating applied directly on the exposed surfaces, the primer coating comprising essentially a one mil thick layer of a cured metal adhering synthetic resin embodying at least 25% of the weight of the resin of corrosion inhibitors selected from at least one of the class consisting of inhibiting chromates and phosphates, and a substantial proportion of iron oxide; an intermediate coating applied directly upon the first primer coating, said second coating being of a thickness of approximately one mil and composed of a cured flexible synthetic resin having intimately and substantially uniformly admixed therein from 15% to 40%, based on the weight of the resin, of mica of a fineness passing through a sieve having 100 meshes per lineal inch; and an exterior finish coating superimposed on the intermediate coating, said exterior finish coating comprising a flexible cured synthetic resin embodying finely divided fillers, the finish coating substantially preventing the passage of ultraviolet radiation therethrough to the second coating, the fillers comprising at least 50% of the weight of the resin.

2. The metallic member of claim 1, wherein the member is of a metal capable of acquiring a protective phosphate coating by treatment of the metal surface with a phosphate composition, the exposed metal surfaces being provided with the protective phosphate coating and with the first primer coating applied upon the protective phosphate coating.

3. A metallic member having surfaces of a metal selected from the group consisting of ferrous metals, zinc and cadmium, comprising, in combination, a protective phosphate coating applied to the metal surfaces; a primer coating of a thickness of approximately one mil applied upon the protective phosphate coating, the primer coating comprising essentially an adherent cured synthetic resin layer carrying from 25% to 150% of the weight of the resin of finely dispersed corrosion inhibitors selected from at least one of the group consisting of inhibiting chromates and phosphates; an intermediate coating of approximately one mil in thickness applied directly over the primer coating, the intermediate coating composed of a cured layer of flexible resin having intimately and substantially uniformly distributed therein from 15% to 40%, based on the weight of the resin, of mica of a fineness passing through a sieve having 350 meshes per lineal inch, the resin in the intermediate layer comprising an oil modified phenolic admixed with a fatty acid modified alkyd; and a finish coating of a thickness of approximately one mil superimposed on the intermediate coating, the finish coating comprising a layer of a cured synthetic resin embodying finely divided fillers opaque to ultraviolet light, the filler comprising particles finer than 40 microns across their largest dimensions, the filler comprising at least 50% of the weight of the resin.

4. An article of manufacture comprising, in combination, a base of ferrous metal, a surface coating of zinc applied to the exposed surfaces of the ferrous metal, a phosphate film applied to the zinc, a primer coating of a thickness of approximately one mil applied upon the protective phosphate coating, the primer coating comprising essentially an adherent cured synthetic resin layer carrying from 25% to 150% of the weight of the resin of finely dispersed corrosion inhibitors selected from at least one of the group consisting of inhibiting chromates and phosphates; an intermediate coating of approximately one mil in thickness applied directly over the primer coating, the intermediate coating composed of a cured layer of flexible resin having intimately and substantially uniformly distributed therein from 15% to 40%, based on the weight of the resin, of mica of a fineness passing through a sieve having 350 meshes per lineal inch, the resin in the intermediate layer comprising an oil modified phenolic admixed with a fatty acid modified alkyd; and a finish coating of a thickness of approximately one mil superimposed on the intermediate coating, the finish coating comprising a layer of a cured synthetic resin embodying finely divided fillers opaque to ultraviolet light, the filler comprising particles finer than 40 microns across their largest dimensions, the filler comprising at least 50% of the weight of the resin.

5. The article of claim 4, wherein the primer coating also includes finely divided iron oxide in an amount such that the iron oxide comprises from 10% to 75% of the combined weight of the corrosion inhibitors.

JAMES G. FORD.

References Cited in the file of this patent

UNITED STATES PATENTS

| Number | Name | Date |
| --- | --- | --- |
| 2,290,905 | Butler | July 28, 1942 |
| 2,407,881 | Hoover et al. | Sept. 17, 1946 |
| 2,459,018 | De Monte et al. | Jan. 11, 1949 |